（12）United States Patent
Arquero et al.

(10) Patent No.: US 10,834,028 B2
(45) Date of Patent: Nov. 10, 2020

(54) DELAYED CONDITION-BASED EMAIL DELIVERY

(71) Applicant: International Business Machines Corporation, Armonk, NY (US)

(72) Inventors: Gregg Arquero, White Plains, NY (US); Steven Burchfield, Woodstock, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/141,065

(22) Filed: Sep. 25, 2018

(65) Prior Publication Data

US 2020/0099636 A1 Mar. 26, 2020

(51) Int. Cl.
  *H04L 12/58* (2006.01)
  *H04L 29/08* (2006.01)

(52) U.S. Cl.
  CPC .............. *H04L 51/04* (2013.01); *H04L 51/34* (2013.01); *H04L 67/18* (2013.01)

(58) Field of Classification Search
  CPC .......... H04L 51/04; H04L 51/34; H04L 67/18
  USPC ....................................................... 709/206
  See application file for complete search history.

(56) References Cited

U.S. PATENT DOCUMENTS

| | | | |
|---|---|---|---|
| 7,233,997 B1* | 6/2007 | Leveridge | G06F 21/33 709/217 |
| 7,603,420 B2* | 10/2009 | Doan | H04L 51/14 709/204 |
| 8,364,765 B2 | 1/2013 | Champlin-Scharff et al. | |
| 8,909,714 B2 | 12/2014 | Agarwal et al. | |
| 9,282,070 B2 | 3/2016 | Haugen et al. | |
| 2004/0122900 A1* | 6/2004 | Pous | G06Q 10/107 709/206 |
| 2005/0108343 A1* | 5/2005 | Collet | H04L 51/14 709/206 |
| 2006/0019638 A1 | 1/2006 | Chiu et al. | |

(Continued)

FOREIGN PATENT DOCUMENTS

JP 2001223734 A 8/2001

OTHER PUBLICATIONS

Disclosed Anonymously, ""Deliver Another Day" : System and Method for Deferred Relay of Communication", IP.com IPCOM000223783D, Nov. 29, 2012, pp. 1-3.

(Continued)

*Primary Examiner* — James E Springer
(74) *Attorney, Agent, or Firm* — Cantor Colburn LLP; Teddi Maranzano

(57) ABSTRACT

Methods, systems and computer program products for providing delayed condition-based email delivery are provided. Aspects include receiving a delayed delivery email including a delivery condition profile, the delayed delivery email being withheld from transmission to a recipient until the satisfaction of one or more conditions of the delivery condition profile. Aspects also include receiving one or more indications of a triggering activity. Responsive to determining that the one or more indications of triggering activity satisfy the one or more conditions of the delivery condition profile, aspects include transmitting the delayed delivery email to a recipient device associated with the recipient.

14 Claims, 6 Drawing Sheets

(56) References Cited

U.S. PATENT DOCUMENTS

| | | | |
|---|---|---|---|
| 2008/0162652 A1* | 7/2008 | True | G06Q 10/107 |
| | | | 709/206 |
| 2009/0049134 A1 | 2/2009 | Kumhyr et al. | |
| 2009/0150489 A1* | 6/2009 | Davis | G06Q 10/107 |
| | | | 709/204 |
| 2009/0157708 A1* | 6/2009 | Bandini | H04L 51/12 |
| 2014/0172988 A1* | 6/2014 | Baldwin | H04L 51/12 |
| | | | 709/206 |
| 2014/0214973 A1* | 7/2014 | DeLuca | H04L 51/26 |
| | | | 709/206 |
| 2014/0229555 A1* | 8/2014 | DeLuca | H04L 51/12 |
| | | | 709/206 |
| 2016/0112359 A1* | 4/2016 | Allen | H04L 51/14 |
| | | | 709/206 |
| 2016/0119274 A1* | 4/2016 | Ghafourifar | H04L 51/36 |
| | | | 709/206 |
| 2016/0182421 A1 | 6/2016 | Mirski-Fitton et al. | |
| 2018/0152403 A1* | 5/2018 | Charignon | H04L 51/16 |

OTHER PUBLICATIONS

Microsoft, [online]; [retrieved on Sep. 24, 2018]; retrieved from the Internet https://support.office.com/en-us/article/delay-or-schedule-sending-email-messages-026af69f-c287-490a-a72f-6c65793744ba?redirectSourcePath=%252fen-us%252farticle%252fDelay-or-schedule-sending-email-messages-253dbfd7-0db7-4f41-bcc5-9e8e68ae29bf&ui=en-US&rs=en-US&ad=US. Delay or schedule sending email, 5pgs.

\* cited by examiner

DELAYED CONDITION-BASED EMAIL DELIVERY

BACKGROUND

The present invention generally relates to email delivery, and more specifically, to providing delayed condition-based email delivery.

Email is commonly used as a communication method between people and can be a particularly useful means of communication between people in different parts of the world. However, because email use has become so ubiquitous, it is has become commonplace for a user's email inbox to become so full with emails after a period of inactivity, that when a user opens their inbox, a given email may not receive the desired amount of attention because it is near the bottom of a queue of lots of other emails. This is particularly problematic where a sender and a recipient are in different time zones, because conventionally, an email sent during business hours in one time zone may arrive during non-business hours in a time zone on the other side of the world, which could mean that by the time the recipient opens their inbox the next day, the recipient may not see or pay adequate attention to the email because they are first confronted with a plurality of newer emails that the recipient has received throughout the night.

SUMMARY

Embodiments of the present invention are directed to a computer-implemented method for providing delayed condition-based email delivery. A non-limiting example of the computer-implemented method includes receiving, by an email server, a delayed delivery email comprising a delivery condition profile, the delayed delivery email being withheld from transmission to a recipient until the satisfaction of one or more conditions of the delivery condition profile. The method also includes receiving, by the email server, one or more indications of a triggering activity. Responsive to determining that the one or more indications of triggering activity satisfy the one or more conditions of the delivery condition profile, the method includes transmitting the delayed delivery email to a recipient device associated with the recipient.

Embodiments of the present invention are directed to a system for providing delayed condition-based email delivery. The system includes a memory having computer readable computer instructions, and a processor for executing the computer readable instructions. The computer readable instructions include instructions for receiving a delayed delivery email comprising a delivery condition profile, the delayed delivery email being withheld from transmission to a recipient until the satisfaction of one or more conditions of the delivery condition profile. The computer readable instructions also include instructions for receiving one or more indications of a triggering activity. Responsive to determining that the one or more indications of triggering activity satisfy the one or more conditions of the delivery condition profile, the computer readable instructions include instructions for transmitting the delayed delivery email to a recipient device associated with the recipient.

Embodiments of the invention are directed to a computer program product for providing delayed condition-based email delivery, the computer program product comprising a computer readable storage medium having program instructions embodied therewith. The computer readable storage medium is not a transitory signal per se. The program instructions are executable by a processor to cause the processor to perform a method. A non-limiting example of the method includes receiving a delayed delivery email comprising a delivery condition profile, the delayed delivery email being withheld from transmission to a recipient until the satisfaction of one or more conditions of the delivery condition profile. The method also includes receiving one or more indications of a triggering activity. Responsive to determining that the one or more indications of triggering activity satisfy the one or more conditions of the delivery condition profile, the method includes transmitting the delayed delivery email to a recipient device associated with the recipient.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
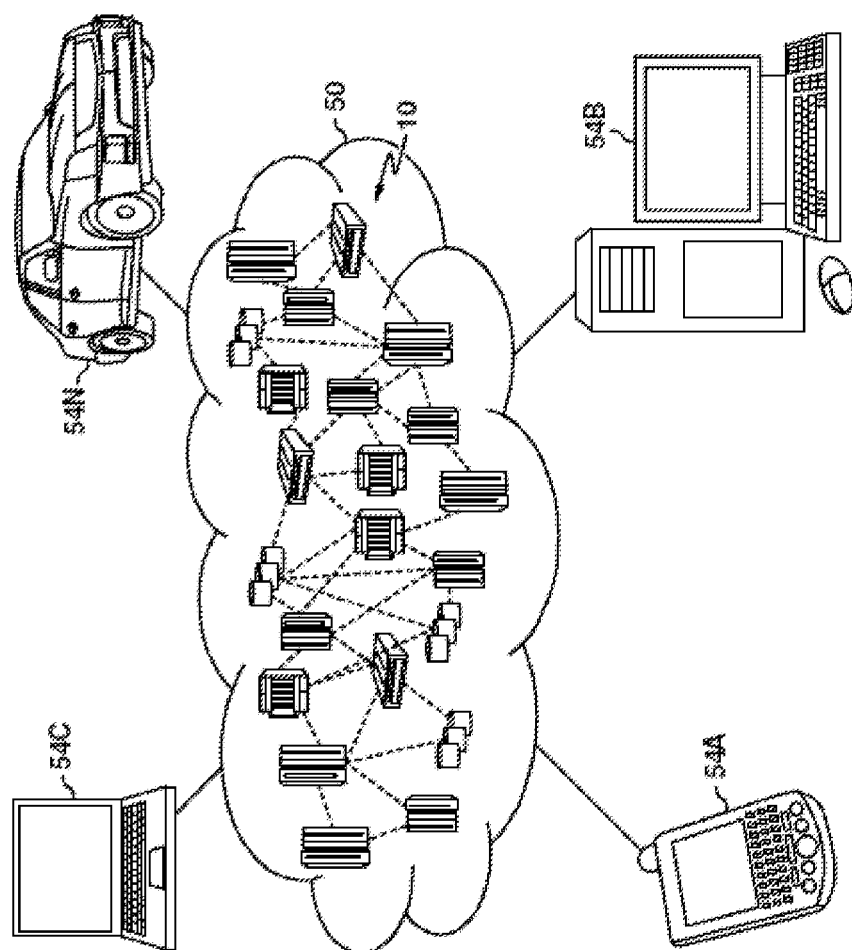
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
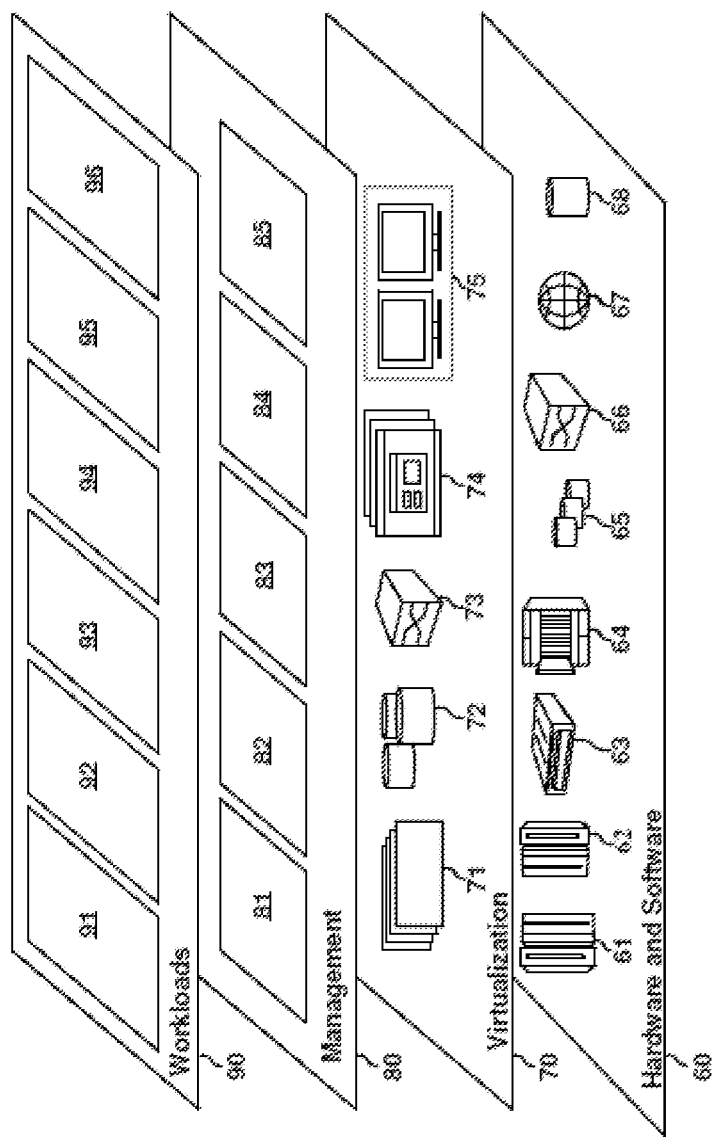
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing delayed condition-based email delivery 96.

Figure 3:
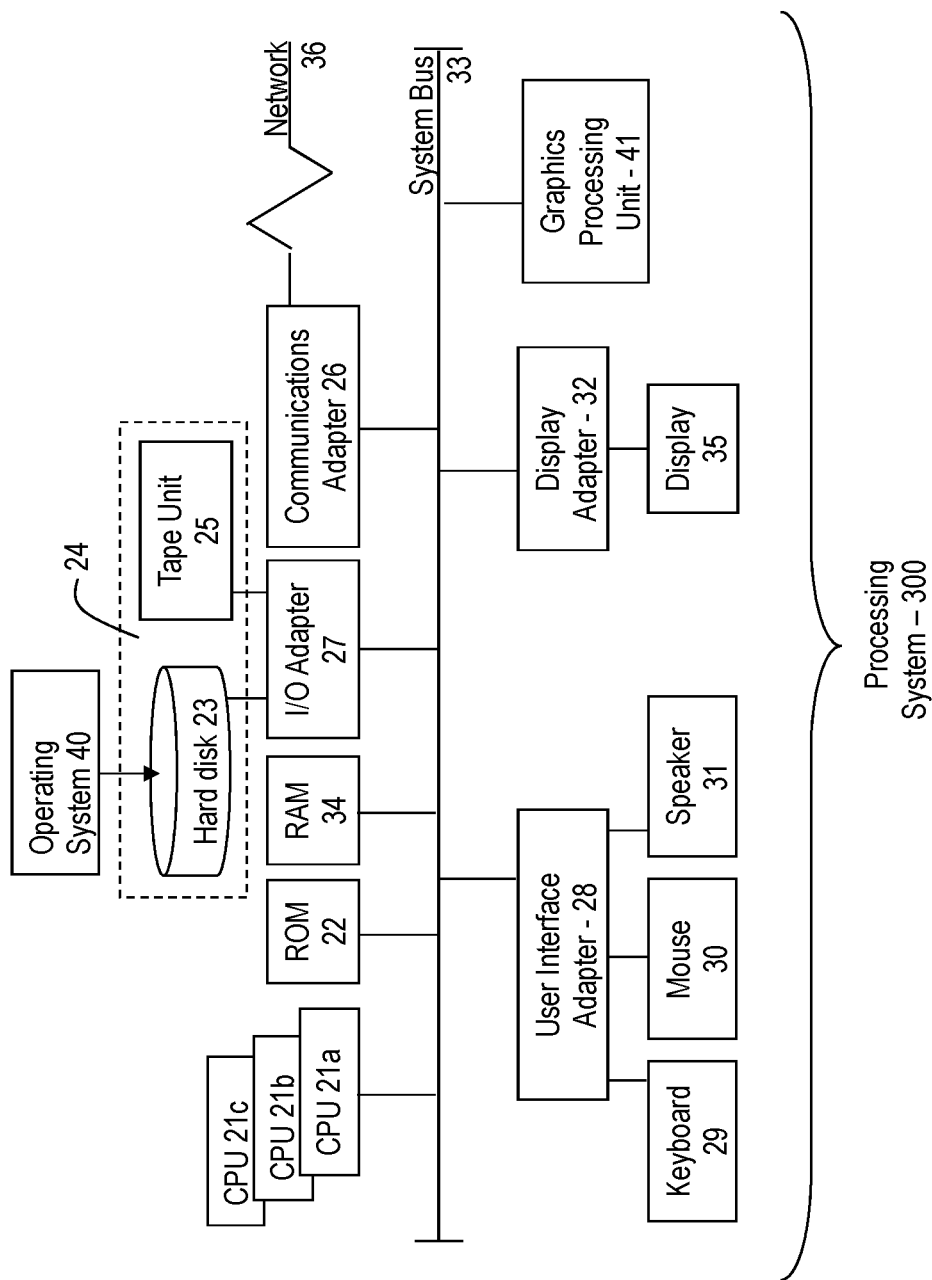
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for providing delayed condition-based email delivery is provided. In exemplary embodiments, the system may be configured to allow a sender of an email to designate an email as being a delayed delivery email before sending the email to a recipient. A delayed delivery email can be one in which the system is configured to delay delivery of the email until the occurrence of one or more conditions, such as for example, waiting for the local time to be a specified time in the time zone of the recipient, waiting for the recipient to open, access or perform some other activity in relation to the recipient's email program or email inbox, specifying that the recipient be using (or not being using) a particular type of device (e.g., smartphone, desktop computer, etc.), waiting for a recipient to be present in a particular geographical location, or some combination of some or all of such conditions. It should be understood that these conditions are merely exemplary and many other such conditions may be used in conjunction with the system described herein. According to some embodiments, after designating an email as a delayed delivery email and/or specifying the delivery conditions on the delivery of the email, the sender may transmit the email and the email may be received by an email server associated with the recipient. In exemplary embodiments, the email server can be configured to identify the email as being classified as a delayed delivery email and may store the email until the satisfaction of the conditions, upon which the email server will transmit the email (or insert the email into a transmission queue for transmission).

For example, a condition may specify that the email should be delivered when the recipient opens their email inbox. Upon opening their email inbox, a recipient's user device may communicate data to the email server that indicates that the recipient has opened their email inbox, and in response, the email server may proceed to transmit the email to the recipient's inbox. To continue the example, if the email server received the delayed delivery email at 1:00 am in the recipient's local time, when the recipient opens their email inbox at 9:00 am, despite having received, for example, 20 other emails between 1:00 am and 9:00 am, the delayed delivery email may be presented in the email inbox as being the most recent email received (and thus be at the top of the list for the recipient's viewing). In this way, the system provides a way for a sender of an email to ensure that a sent email will not be lost in a multitude of other emails received by the recipient, but may be received and presented under conditions in which the recipient is likely to see and pay attention to the email. This system provides technical advantages over systems that may, for example, simply allow a sender to delay sending an email from the sender's email server, because emails may take an unknown amount of time to travel across the internet to the recipient's email server, which does not allow precise delivery of emails. Further, the present system can use indicators derived from a recipient's usage of a recipient device (e.g., opening/use of email system, recipient's location/movement, etc.) to determine exactly when to deliver an email to a recipient and because the email is already being held by the recipient's email server (thus removing the uncertainties presented by internet path delays), it may be delivered in a more finely-tuned window than conventional methods. The system's ability to deliver the email to the recipient in a finely-tuned timeframe and/or based on the recipient's activities provide a significantly greater chance that the recipient will see and view the email in an attentive state.

Figure 4:
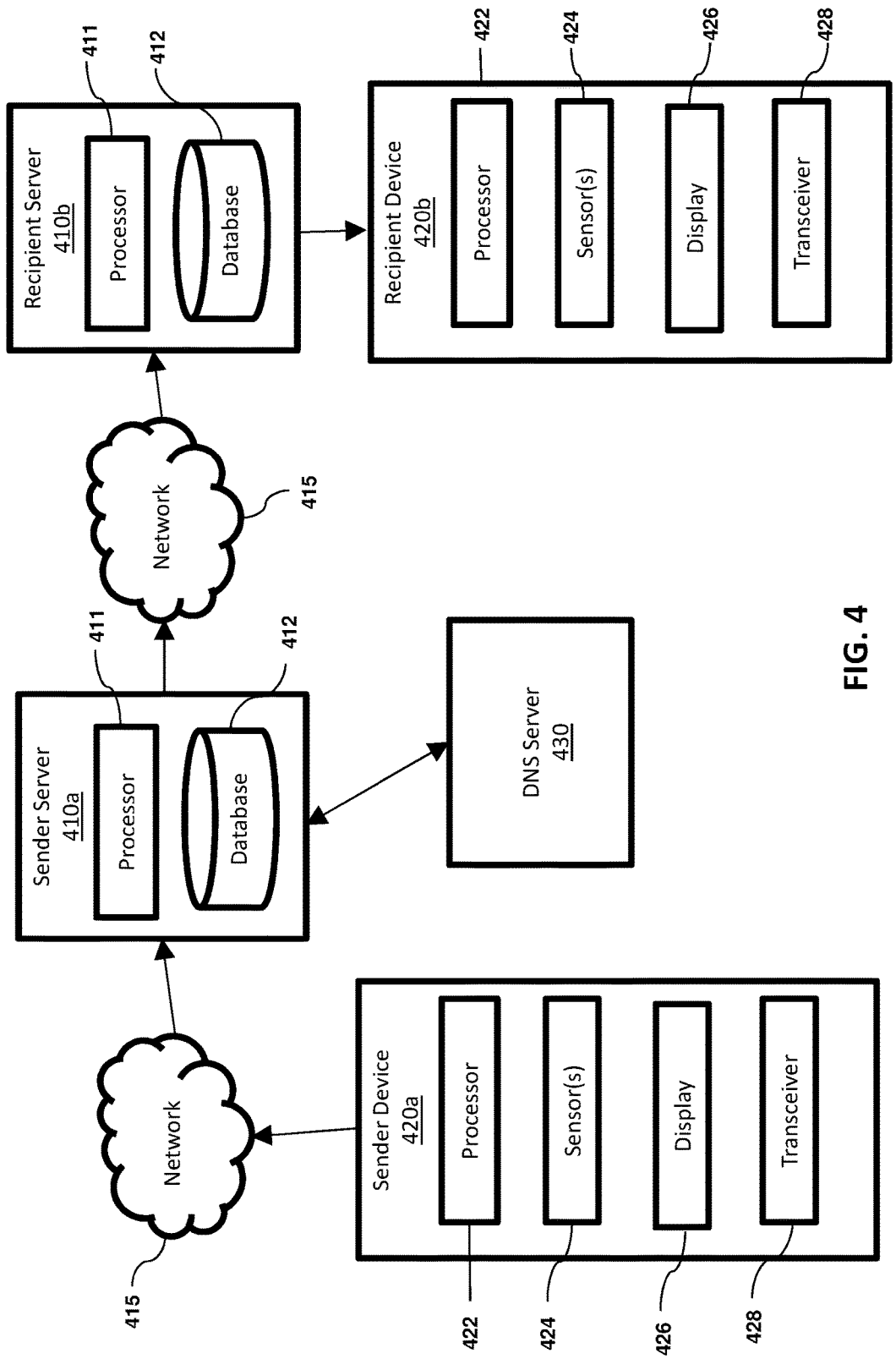
FIG. 4 depicts a system upon which providing delayed condition-based email delivery maybe be implemented according to one or more embodiments of the present invention.

Turning now to FIG. 4, a system 400 for providing delayed condition-based email delivery will now be described in accordance with an embodiment. The system 400 includes a sender server 410a in communication with a recipient server 410b, a sender device 420a, and a DNS server 430 via communications network 415. Recipient server 410b is in communication with a recipient device 420b, either via a direct connection, local network or via communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). Recipient server 410b is configured to receive and store a delayed delivery email, determine when delivery conditions have been met, and transmit the delayed delivery email to the recipient device 420b upon the satisfaction of the delivery conditions. According to some embodiments, sender server 410a can be associated with an internet service provider (ISP) that services sender device 420a and recipient server 410b can be associated with an ISP that services recipient device 420b. Further, in some embodiments, sender device 420a and/or sender server 410a can be located in a first time zone, whereas recipient device 420b and/or recipient server 410b can be located in a different second time zone (e.g., on the other side of the world).

In exemplary embodiments, sender and recipient devices 420a,b can include, but are not limited to, a smartphone, a wearable device such as a smartwatch, an augmented reality headset, a tablet, a laptop, a desktop computer, a computer system such as the one shown in FIG. 3, a television, or any other suitable electronic device. Each sender device 420a and receiver device 420b can include a processor 422, one or more sensors 424, a display 426 and a transceiver 428. The sensors 424 can include one or more of an image capture device (e.g., digital camera) for obtaining images and/or videos, a gyroscope for detecting motion, a microphone for obtaining audio recordings, and a location sensor for obtaining location data of the user device (e.g., GPS coordinates). Sender/recipient devices 420a,b can include an input device, such as a keyboard (either physical or digital) and/or a mouse for receiving user inputs. Display 426 is configured to display a user interface of an email program. In some embodiments, display 426 can be a touchscreen that may be configured to detect tactile user inputs (e.g., typing, pressing, swiping, etc.). Transceiver 428 can be configured to allow a sender/recipient device 420a,b to communicate with other devices via communications network 415 (e.g., via Wi-Fi, cellular communications, etc.).

Sender device 420a is configured to receive user inputs to compose an email message, designate the email as a delayed delivery email, customize a delivery condition profile, and transmit the email. For example, an email client/application of sender device 420a can include a user interface that can allow a sender to specify a delivery condition profile of a delayed delivery email that includes one or more conditions, such as a local delivery time condition, a local delivery time window condition, a recipient activity condition, a recipient location condition, and a recipient device type condition.

Recipient device 420b is configured to receive and display one or more emails (e.g., via a user interface of an email client/application). Recipient device 420b is configured to detect various activity and information, such as for example, the recipient's interactions with an email client/application on the recipient device 420b, the type of device (e.g., mobile device, desktop computer) that the recipient device 420b is, and the recipient's location and/or movement.

According to some embodiments, sender server 410a and recipient server 420b can each include a processor 411 and database 412 (or other memory) for processing and storing data. In some embodiments, a sender server 410a can be a conventional email server that receives emails from sender device 420a and forwards the emails to recipient server 410b via network 415. As will be understood by those of skill in the art, sender server 410a may communicate with a DNS server 430 to convert an email address associated with an email sent by sender server 410a into an IP address for delivery. Based on the determined IP address, sender server

410a may transmit the email to recipient server 410b for ultimate delivery to recipient device 420b. According to some embodiments, sender server 410a and recipient server 410b can be located in different parts of the world, and forwarding an email from sender server 410a to recipient server 410b could take several seconds, minutes, or even hours in extreme cases depending on the availability and throughput of the network paths used.

According to some embodiments, upon receiving an email, recipient server 410b can be configured to determine whether the email has been designated as being a delayed delivery email, by, for example, detecting a delayed delivery email flag associated with the email, analyzing metadata associated with the email, or through similar approaches. If the recipient server 410b determines that the email is a delayed delivery email, the recipient server 410b stores the email until one or more conditions of an associated delivery condition profile are satisfied, as described in greater detail below with respect to FIG. 5 and method 500. Recipient server 410b can be configured to receive signals and data from one or more recipient devices 420b to determine, for example, the location, movement, and activity of a recipient with respect to the recipient device 420b. For example, recipient device 420b may be configured to send a message to recipient server 410b when the recipient opens their email inbox, activates an email client/application, or performs some other activity on the device. In response to receiving the message, recipient server 410b may determine that the recipient is now actively using an email client/application (whereas the recipient's use of the email client had been previously inactive for some period of time), which may serve as a trigger for recipient server 410b to transmit one or more delayed delivery emails to recipient device 410b. Although this disclosure generally describes the temporary storage of a delayed delivery email being performed by recipient server 410b, in some embodiments, similar functions could be carried out by sender server 410a. Further, in some embodiments, recipient server 410b and sender server 410a may be a single device.

Figure 5:
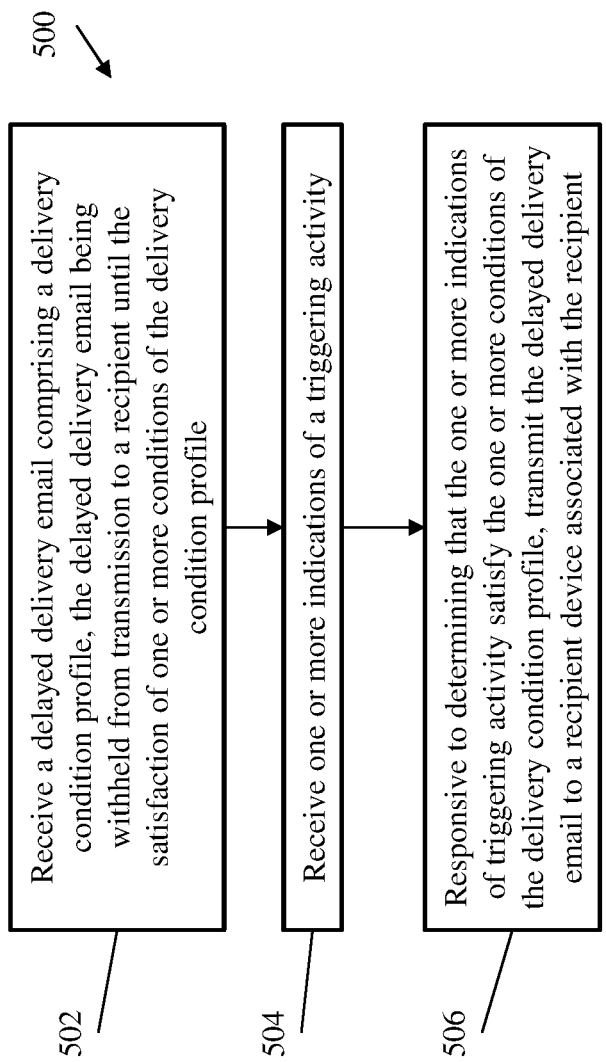
FIG. 5 depicts a flow diagram of a method for providing delayed condition-based email delivery according to one or more embodiments of the invention.

Turning now to FIG. 5, a flow diagram of a method 500 for providing delayed condition-based email delivery in accordance with an embodiment is shown. In one or more embodiments of the present invention, the method 500 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing systems, such as the processing system 300 described hereinabove and illustrated in FIG. 3, or in some other type of computing or processing environment.

The method 500 begins at block 502 and includes receiving, by an email server (e.g., recipient server 410b), a delayed delivery email comprising a delivery condition profile. According to some embodiments, an email server (e.g., recipient server 410b) may determine that a received email is a delayed delivery email by analyzing flags, headers, or other metadata associated with the email. The email server (e.g., recipient server 410b) can withhold the delayed delivery email from transmission to a recipient (e.g., recipient device 420b) until the satisfaction of one or more conditions of the delivery condition profile. For example, conditions may include one or more of a condition that the delayed delivery email be delivered at a specified time in the recipient's time zone, a condition that the recipient has accessed, opened, viewed, activated, or otherwise interacted with an email application (e.g., opening an email inbox), a condition that the recipient has opened an email application on a specified type of device (e.g., a mobile device, a desktop, etc.), a condition that the recipient be present at a specified location, and a condition that the delayed delivery email be delivered within a specified time window of a day in a specified time zone (e.g., any time between 9:00 am and 10:00 am in the recipient's time zone). It should be understood that these conditions are exemplary and not intended to be limiting in any way.

Next, as shown at block 504, the method includes receiving, by the email server (e.g., recipient server 410b), one or more indications of a triggering activity. For example, indications of a triggering activity could be one or more of an indication of the current time in a specified time zone (e.g., the recipient's time zone), data received from an email client associated with the recipient device that provides information relating to a recipient's use or interactions with the email client or email application on a device and/or the type of device being used to interact with the email client/application, and location data received from a recipient device 420b. It should be understood that these indications of triggering activity are exemplary and not intended to be limiting in any way.

Next, in response to determining that the one or more indications of a triggering activity satisfy the one or more conditions of the delivery condition profile, the method includes transmitting (e.g., by recipient server 410b) the delayed delivery email to a recipient device 420b associated with the recipient, as shown at block 506. It will be appreciated that the determination that the one or more indications of a triggering activity satisfy the one or more conditions will vary based on the nature of the conditions associated with the delayed delivery email and the indications of triggering activity received by the email server. In various embodiments, determining that the one or more indications of a triggering activity satisfy the one or more conditions of the delivery condition can include one or more of: determining that the current time in a specified time zone (e.g., a time zone associated with the recipient) is equal to or later than a specified time (e.g., specified by the sender); determining, based on data received from a recipient device 420b, that the recipient has accessed, opened, viewed, activated, or otherwise interacted with an email application; determining, based on data received from a recipient device 420b, a type of device (e.g., smart phone, desktop computer, etc.) used by the recipient to access, open, view, activate or otherwise interact with the email application and determining that the type of device is the same as the specified type of device (e.g., specified by the sender); determining that location data received from a recipient device 420b corresponds to a specified location (e.g., specified by the sender); and determining that the current time in the specified time zone (e.g., a time zone associated with the recipient) is within the specified time window. It will be appreciated that these examples are not intended to be limiting in any way, as it is contemplated that a sender may use the system to create customized combinations of delayed delivery conditions. For example, a sender may believe that a recipient may simply gloss over a complicated chart included in an email if viewed on a cell phone and may similarly be distracted if viewing the email at home, so the sender may input conditions that require the recipient to be using a desktop or laptop computer at the recipient's office location before delivering the delayed delivery email. In this case, recipient server 410b may receive data from a plurality of recipient devices 420b and can be configured to identify the type of device the recipient is using to identify when the recipient is using a desktop or laptop computer. Likewise, the recipient server 410b may determine the recipient's location by, for example, receiving GPS coordinates of the user's mobile device 420b or deriving the location, for example, based on the IP address of the recipient's desktop computer that is in use by the recipient. In some embodiments, a recipient may register one or more recipient devices 420b with the system 400. In some embodiments, the system may automatically associate one or more recipient devices 420b with a recipient by analyzing, for example, email traffic or other data transmitted to and from the devices 420b.

In some embodiments, after determining that the conditions of the delivery condition profile have been satisfied, the email server may immediately transmit the delayed delivery to a recipient device 420b. According to some embodiments, the email server (e.g., recipient server 410b) may receive a plurality of other emails that are placed in a transmission queue of the email server for sequential transmission to their respective destinations and the email server may place the delayed delivery email in the transmission queue upon determining that the one or more delivery conditions are satisfied. In some embodiments, the email server may place the delayed delivery email at the front of the transmission queue so that it will be the next email to be transmitted. In some embodiments, the email server e.g., recipient server 410b) may delay transmitting the delayed delivery email by some predetermined amount of time, such as, for example a few seconds, to allow other pending email transmissions to occur first so in a case where the recipient device 420b is waiting to receive a batch of emails from the recipient server 410b, the other emails in the batch will be delivered first, such that the delayed delivery email will be received last and displayed as the most recently received email in the recipient's email inbox. Similarly, if recipient server 410b has more than one delayed delivery email to send to a particular recipient at once, the recipient server 410b may treat them as a group relative to the non-delayed delivery emails. For example, if the email server is configured to put the delayed delivery emails at the front of a transmission queue, it will be recognized that only one such email can be at the front, but that the delayed delivery emails may be placed at the front of the transmission queue as a group.

Figure 6:
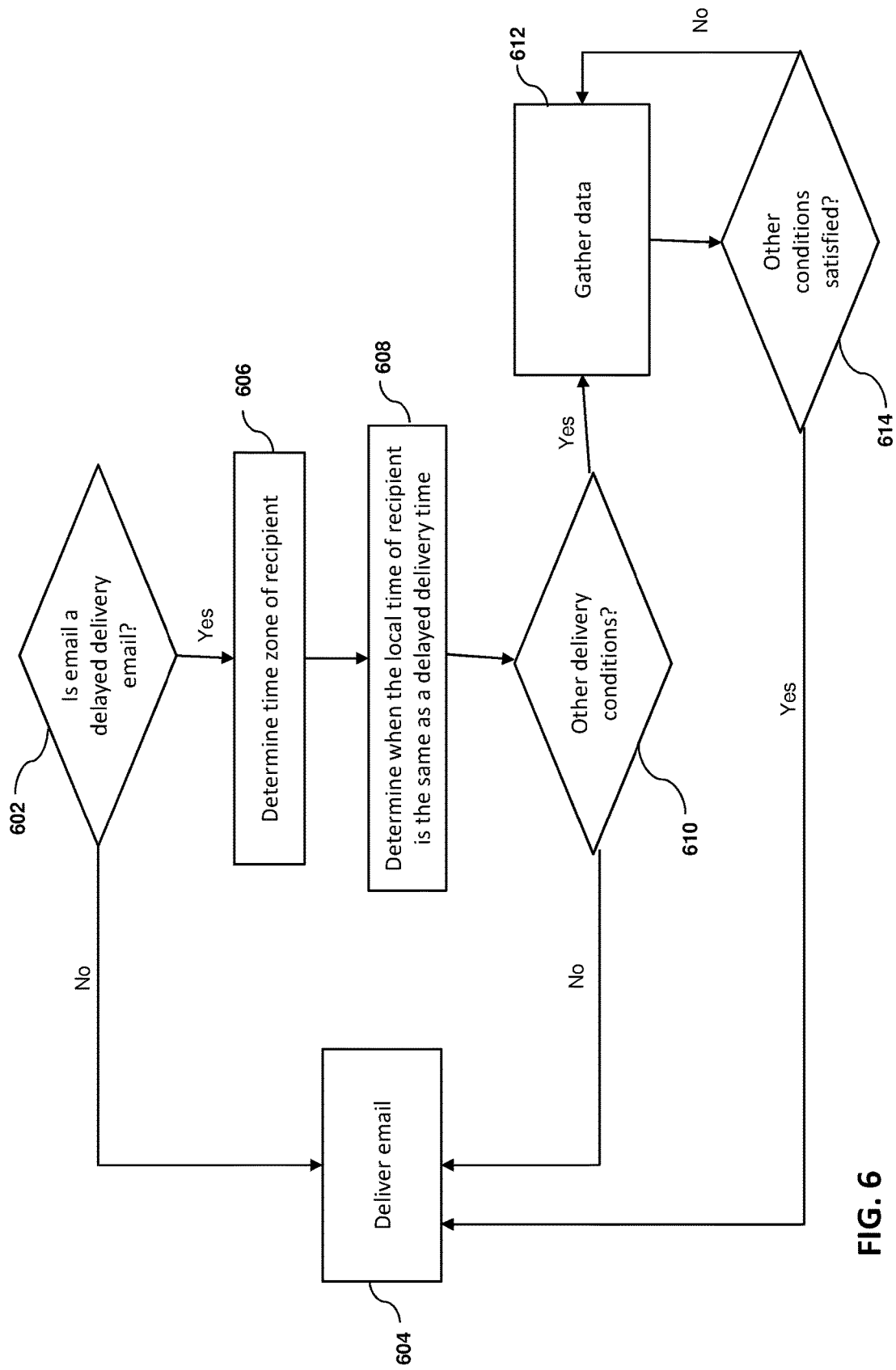
FIG. 6 depicts a flow diagram of a method for providing local time email delivery according to one or more embodiments of the invention.

FIG. 6 depicts a flow diagram of a method for providing local time email delivery according to one or more embodiments of the invention. In one or more embodiments of the present invention, the method 600 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing systems, such as the processing system 300 described hereinabove and illustrated in FIG. 3, or in some other type of computing or processing environment.

The method 600 begins at block 602 and includes determining whether a received email is classified as a delayed delivery email. For example, as described above, recipient server 410b can be configured to determine if a received email is a delayed delivery email by examining flags, headers, and/or other metadata. If recipient server 410b determines that the email is not a delayed delivery email, the method proceeds to block 604 where the recipient server 410b can deliver the email to the recipient device 420b (either immediately or by placing the email in transmission queue). If the recipient server 410b determines that the email is a delayed delivery email, the method proceeds to block 606 where the system determines a time zone of the recipient of the email. According to some embodiments, the time zone of the recipient may be, for example, stored in an address book of the sender, included the metadata of the email, stored by the recipient server 410b, determined by analyzing recently used IP addresses of recipient devices 420b, receiving GPS data from a recipient device 420b or by any other suitable method.

Next, as shown in block 608, the method 600 includes determining when the local time of the recipient is the same as a delayed delivery time associated with the delayed delivery email. For example, if the sender-specified that they wanted the email delivered after 9:00 am local time, the system 400 would monitor the local time of the recipient to determine when 9:00 am has occurred. Once the local time has occurred, the delayed delivery email may be delivered if there are no other delivery conditions associated with the delayed delivery email. Accordingly, at block 610 the method includes determining if there are any other delivery conditions associated with the delayed delivery email, by for example, examining the metadata of the delayed delivery email. If there are not, the method proceeds to block 604 and the delayed delivery email is delivered. If there are additional conditions, the method proceeds to block 612 where the system gathers data that can represent indications of triggering activity as previously described above or other activity of the recipient. At block 614, the method includes determining if the other conditions are satisfied based on the data collected. Other conditions can include, for example, one or more or any of the conditions previously described above with respect to block 502 of method 500. If the recipient server 410b determines that the other conditions are satisfied, then the method proceeds to block 604 where the email is delivered, otherwise, the method reverts back to block 612 for further collection of data.

Additional processes may also be included. It should be understood that the processes depicted in FIGS. 5 and 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving, by a recipient server that interacts with a recipient device associated with a recipient, an email from a sender server, the sender server being distinct from the recipient server;
    analyzing a header of the received email by the recipient server;
    based on analyzing the header of the received email, determining, by the recipient server, that the received email is a delayed delivery email comprising a delivery condition profile, the delayed delivery email being withheld from transmission to the recipient until satisfaction of one or more conditions of the delivery condition profile, wherein the one or more conditions comprise a condition that the recipient has opened an email application on a specified type of device;
    storing the delayed delivery email on the recipient server based on the delivery condition profile;

receiving, by the recipient server, one or more indications of a triggering activity from the recipient device, wherein the one or more indications of the triggering activity comprise data received from the email application associated with the recipient device; and responsive to determining that the one or more indications of the triggering activity satisfy the one or more conditions of the delivery condition profile, transmitting, by the recipient server, the delayed delivery email to the recipient device associated with the recipient, wherein determining that the one or more indications of the triggering activity satisfy the one or more conditions of the delivery condition profile comprises:

determining, based on the data from the email application, a type of the recipient device; and determining that the type of the recipient device is the same as the specified type of device.

2. The computer-implemented method of claim 1, wherein:

the delayed delivery email is received from a sender device located in a first time zone;

the one or more conditions comprise a condition that the delayed delivery email be delivered at a specified time in a second time zone;

the one or more indications of the triggering activity comprise an indication of a current time in the second time zone; and determining that the one or more indications of the triggering activity satisfy the one or more conditions of the delivery condition profile comprises determining that the current time in the second time zone is equal to or later than the specified time.

3. The computer-implemented method of claim 1, wherein:

the one or more conditions comprise a condition that the recipient be present at a specified location;

the one or more indications of a triggering activity comprise location data received from the recipient device; and determining that the one or more indications of the triggering activity satisfy the one or more conditions of the delivery condition profile comprises determining that the location data corresponds to the specified location.

4. The computer-implemented method of claim 3, wherein:

the one or more conditions further comprise a condition that the delayed delivery email be delivered within a specified time window of a day in a second time zone;

the one or more indications of the triggering activity further comprise an indication of the current time in the second time zone; and determining that the one or more indications of the triggering activity satisfy the one or more conditions of the delivery condition profile further comprises determining that the current time in the second time zone is within the specified time window.

5. The computer-implemented method of claim 1, wherein the delayed delivery email is generated by a sender device in response to a sender inputting:

a selection that an email should have a delayed delivery; and at least one condition of a local delivery time condition, a local delivery time window condition, a recipient activity condition, a recipient location condition, and a recipient device type condition.

6. The computer-implemented method of claim 1, further comprising:

responsive to receiving a plurality of delayed delivery emails for the recipient, placing each of the plurality of delayed delivery emails in a transmission queue;

wherein transmitting the delayed delivery email to a recipient device associated with the recipient comprises placing the delayed delivery emails in the transmission queue and transmitting the plurality of delayed delivery emails to the recipient device.

7. The computer-implemented method of claim 6, wherein placing the delayed delivery email in the transmission queue comprises placing the delayed delivery email at a front of the transmission queue.

8. The computer-implemented method of claim 1, wherein the recipient server is associated with an internet service provider of the recipient.

9. A system comprising:

a recipient server comprising a processor communicatively coupled to a memory, wherein the recipient server interacts with a recipient device associated with a recipient, the processor configured to:

receive an email from a sender server, the sender sever server being distinct from the recipient server;

analyze a header of the received email;

based on analyzing the header of the received email, determine that the received email is a delayed delivery email comprising a delivery condition profile from a sender server, the sender server being distinct from the recipient server, the delayed delivery email being withheld from transmission to the recipient until satisfaction of one or more conditions of the delivery condition profile, wherein the one or more conditions comprise a condition that the recipient has opened an email application on a specified type of device;

store the delayed delivery email on the recipient server based on the delivery condition profile;

receive one or more indications of a triggering activity, wherein the one or more indications of the triggering activity comprise data received from the email application associated with the recipient device; and responsive to determining that the one or more indications of the triggering activity satisfy the one or more conditions of the delivery condition profile, transmit the delayed delivery email to the recipient device associated with the recipient, wherein determining that the one or more indications of the triggering activity satisfy the one or more conditions of the delivery condition profile comprises:

determining, based on the data from the email application, a type of the recipient device; and determining that the type of the recipient device is the same as the specified type of device.

10. The system of claim 9, wherein:

the delayed delivery email is received from a sender device located in a first time zone;

the one or more conditions comprise a condition that the delayed delivery email be delivered at a specified time in a second time zone;

the one or more indications of the triggering activity comprise an indication of the current time in the second time zone; and determining that the one or more indications of triggering activity satisfy the one or more conditions of the delivery condition profile comprises determining that the current time in the second time zone is equal to or later than the specified time.

11. The system of claim 9, wherein:
the one or more conditions comprise a condition that the recipient be present at a specified location;
the one or more indications of the triggering activity comprise location data received from the recipient device; and
determining that the one or more indications of the triggering activity satisfy the one or more conditions of the delivery condition profile comprises determining that the location data corresponds to the specified location.

12. The system of claim 11, wherein:
the one or more conditions further comprise a condition that the delayed delivery email be delivered within a specified time window of a day in a second time zone;
the one or more indications of the triggering activity further comprise an indication of the current time in the second time zone; and
determining that the one or more indications of the triggering activity satisfy the one or more conditions of the delivery condition profile further comprises determining that the current time in the second time zone is within the specified time window.

13. A computer program product comprising a computer readable storage medium having program instructions embodied therewith, wherein the computer readable storage medium is not a transitory signal per se, the program instructions executable by a computer processor to cause the computer processor to perform a method comprising:
receiving, by a recipient server that interacts with a recipient device associated with a recipient, an email from a sender server, the sender server being distinct from the recipient server;
analyzing a header of the received email by the recipient server;
based on analyzing the header of the received email, determining, by the recipient server, that the received email is a delayed delivery email comprising a delivery condition profile, the delayed delivery email being withheld from transmission to the recipient until satisfaction of one or more conditions of the delivery condition profile, wherein the one or more conditions comprise a condition that the recipient has opened an email application on a specified type of device;
storing the delayed delivery email on the recipient server based on the delivery condition profile;
receiving, by the recipient server, one or more indications of a triggering activity from the recipient device, wherein the one or more indications of the triggering activity comprise data received from the email application associated with the recipient device; and
responsive to determining that the one or more indications of the triggering activity satisfy the one or more conditions of the delivery condition profile, transmitting, by the recipient server, the delayed delivery email to the recipient device associated with the recipient, wherein determining that the one or more indications of the triggering activity satisfy the one or more conditions of the delivery condition profile comprises:
determining, based on the data from the email application, a type of the recipient device; and
determining that the type of the recipient device is the same as the specified type of device.

14. The computer program product of claim 13, wherein:
the delayed delivery email is received from a sender device located in a first time zone;
the one or more conditions comprise a condition that the delayed delivery email be delivered at a specified time in a second time zone;
the one or more indications of the triggering activity comprise an indication of the current time in the second time zone; and
determining that the one or more indications of the triggering activity satisfy the one or more conditions of the delivery condition profile comprises determining that the current time in the second time zone is equal to or later than the specified time.

* * * * *